United States Patent
Barna et al.

(10) Patent No.: US 9,531,959 B2
(45) Date of Patent: Dec. 27, 2016

(54) IMAGING SYSTEMS AND METHODS FOR CAPTURING IMAGE DATA AT HIGH SCAN RATES

(71) Applicant: SEMICONDUCTOR COMPONENTS INDUSTRIES, LLC, Phoenix, AZ (US)

(72) Inventors: Sandor Barna, Los Altos, CA (US); Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 103 days.

(21) Appl. No.: 14/473,963

(22) Filed: Aug. 29, 2014

(65) Prior Publication Data

US 2016/0065821 A1    Mar. 3, 2016

(51) Int. Cl.
*H04N 5/235* (2006.01)
*H04N 5/369* (2011.01)

(52) U.S. Cl.
CPC .......... *H04N 5/2353* (2013.01); *H04N 5/2355* (2013.01); *H04N 5/3698* (2013.01)

(58) Field of Classification Search
CPC .................................................. H04N 5/2353
USPC .............................................. 348/368, 229.1
See application file for complete search history.

(56) References Cited

U.S. PATENT DOCUMENTS

| 5,828,381 | A | 10/1998 | Penna |
| 7,880,775 | B2 | 2/2011 | Tay |
| 8,432,761 | B2 | 4/2013 | Kim et al. |
| 8,547,585 | B2 | 10/2013 | Akahane |
| 2003/0193611 | A1 | 10/2003 | Yoshimura |
| 2010/0201860 | A1* | 8/2010 | Rhodes ............. H01L 27/14609 348/308 |
| 2011/0285890 | A1* | 11/2011 | Choi .................... H04N 5/2251 348/308 |
| 2012/0218426 | A1* | 8/2012 | Kaizu ................ H04N 5/35554 348/208.4 |
| 2012/0293698 | A1* | 11/2012 | Sukegawa ............. H01L 25/167 348/294 |
| 2013/0278807 | A1* | 10/2013 | Horiike ............. H01L 27/14623 348/308 |
| 2014/0333799 | A1* | 11/2014 | Nakagawara ........ H04N 5/2357 348/228.1 |

(Continued)

FOREIGN PATENT DOCUMENTS

JP    2004140479 A  *  5/2004

*Primary Examiner* — Antoinette Spinks
(74) *Attorney, Agent, or Firm* — Treyz Law Group, P.C.; Michael H. Lyons

(57) ABSTRACT

An imaging system may include a rolling shutter image sensor, data rate reduction circuitry, and image processing circuitry. The image sensor may output image data to the data rate reduction circuitry at a first high speed data rate. The data rate reduction circuitry may store the image data at the first data rate and may output the stored image data at a second reduced speed data rate. The image processing circuitry may receive the image data at the second data rate and may perform image processing operations at the second data rate. The data rate reduction circuitry may generate accumulated image frames by accumulating image frames received from the image sensor at the first data rate and may provide the accumulated frames to the image processing circuitry at the second data rate. The image processing circuitry may perform image processing operations on the accumulated frames at the second data rate.

20 Claims, 6 Drawing Sheets

(56) References Cited

U.S. PATENT DOCUMENTS

| | | | |
|---|---|---|---|
| 2014/0362918 A1* | 12/2014 | Bushell | H04N 19/172 375/240.15 |
| 2015/0156434 A1* | 6/2015 | Luo | H04N 5/378 250/208.1 |
| 2015/0163403 A1* | 6/2015 | Wakabayashi | H04N 5/378 348/308 |
| 2015/0201118 A1* | 7/2015 | Lee | H04N 5/2355 348/222.1 |

* cited by examiner

IMAGING SYSTEMS AND METHODS FOR CAPTURING IMAGE DATA AT HIGH SCAN RATES

BACKGROUND

This relates generally to imaging devices, and more particularly, to imaging devices having pixel arrays with high scan rate capabilities.

Image sensors are commonly used in electronic devices such as cellular telephones, cameras, and computers to capture images. In a typical arrangement, an electronic device is provided with an array of image pixels arranged in pixel rows and pixel columns. Row control circuitry is coupled to each pixel row and column readout circuitry is coupled to each pixel column for reading out image data from the array.

Many conventional image sensors capture image data using a rolling shutter scheme in which pixels in different rows of the array begin integrating charge at different times. When using a rolling shutter scheme, offsets in the time between integration periods for different rows of the array can generate undesirable rolling shutter artifacts in the final image, in which objects in the imaged scene that move during image data readout are distorted. In some scenarios, image sensors use a global shutter scheme to integrate charge using all pixels in the array at the same time. However, use of a global shutter scheme can require significant device process complexity, can undesirably reduce sensitivity, reduce pixel charge storage capacity, increase read noise, and increase dark current relative to sensors that perform image capture using a rolling shutter scheme.

It would therefore be desirable to be able to provide imaging devices with improved means of capturing and processing image signals.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
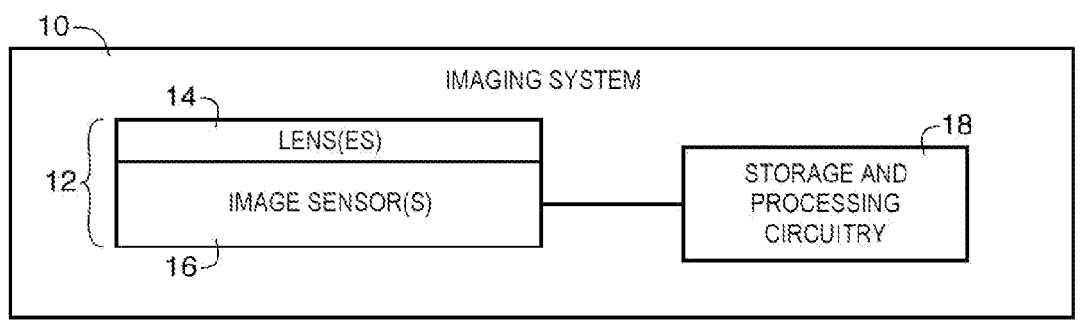
FIG. 1 is a diagram of an illustrative imaging system having an image sensor and processing circuitry in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, a bar code scanner such as a one or two-dimensional bar code scanner, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer, external display, or other device) using wired and/or wireless communications paths coupled to processing circuitry 18. Storage and processing circuitry 18 may store and process image data at a system data rate (e.g., a system frame rate) such as 60 frames per second or any other desired system frame rate.

Figure 2:
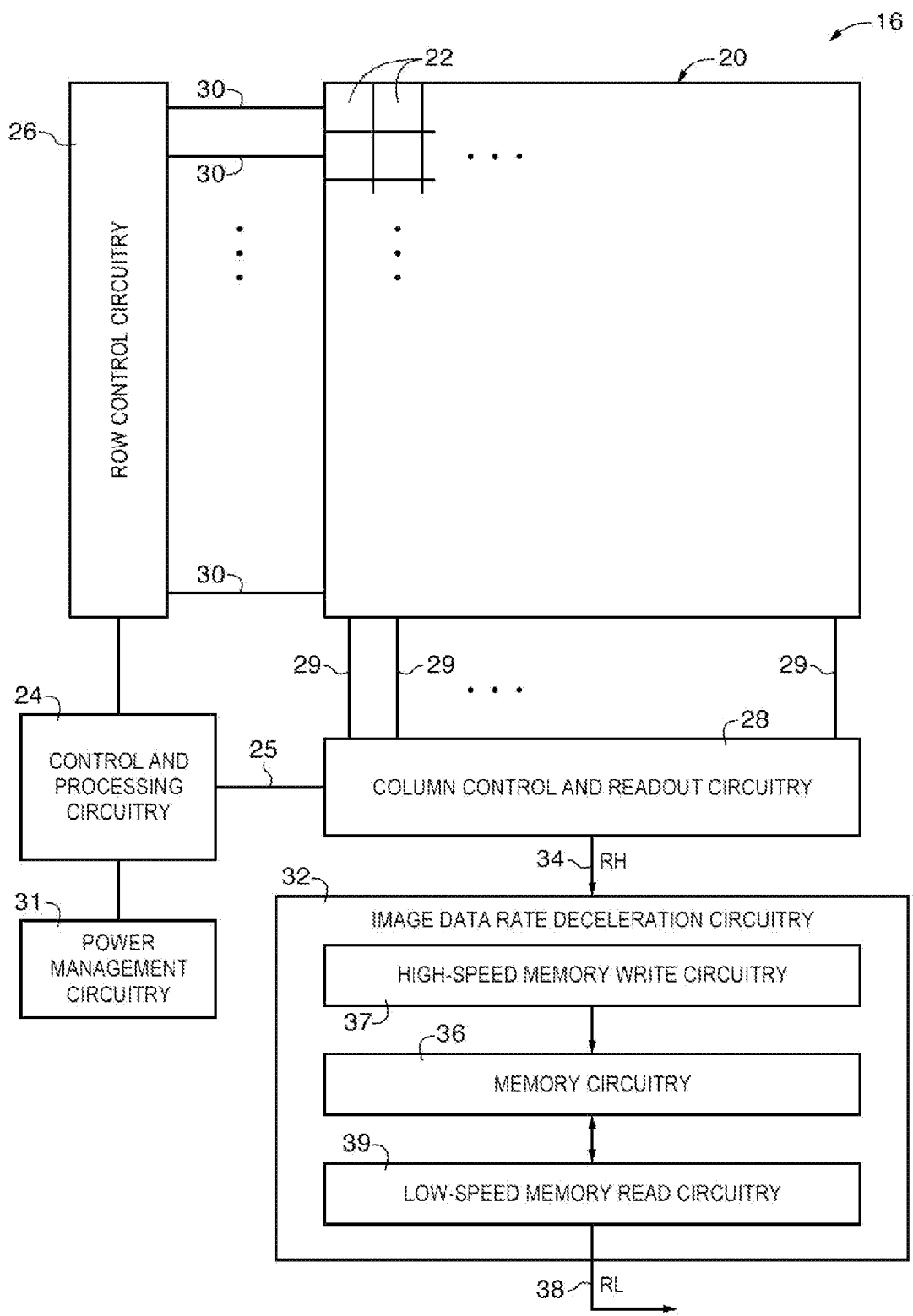
FIG. 2 is a diagram of an illustrative image sensor having image data rate deceleration circuitry for interfacing between an image sensor that captures image data at a relatively high data rate (scan rate) and processing circuitry that processes image data at a relatively low data rate in accordance with an embodiment of the present invention.

As shown in FIG. 2, image sensor 16 may include a pixel array 20 containing image sensor pixels 22 arranged in rows and columns (sometimes referred to herein as image pixels or pixels arranged in pixel rows and pixel columns) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, column decoder circuitry, or column control and readout circuitry). Row control circuitry 26 may receive row addresses from control circuitry 24 and supply corresponding row control signals such as reset, row select, charge transfer, and readout control signals to pixels 22 over row control paths 30. One or more conductive lines such as column lines 29 may be coupled to each column of pixels 22 in array 20. Column lines 29 may be used for reading out image signals from pixels 22, for supplying bias signals (e.g., bias currents or bias voltages), for supplying control signals to pixels 22, etc. If desired, during pixel readout operations, a pixel row in array 20 may be selected using row control circuitry 26 and image signals generated by image pixels 22 in that pixel row can be read out along column lines 29.

Column readout circuitry 28 may include amplifier circuitry, memory circuitry (e.g., latch circuitry), sample and hold circuitry, analog-to-digital converter (ADC), or any other desired readout circuitry coupled to column lines 29. ADC circuitry in readout circuitry 28 may convert analog image signals captured by pixels 22 into digital image signals. For example, circuitry 28 may convert analog image signals captured by pixels 22 into frames of digital image data (e.g., image frames having rows and columns of digital pixel values). Power management circuitry such as power management circuitry 31 may control power usage and consumption in image sensor 16 during image capture operations (e.g., by providing desired control signals to image sensor 16).

Image sensor 16 may capture image data using a rolling shutter scheme in which pixel exposure (integration) begins at different times for each row in array 20. Image sensor 16 may sometimes be referred to herein as rolling shutter image sensor 16 or rolling shutter image sensor 16. When using a rolling shutter scheme, rolling shutter artifacts can be introduced into the image data in which objects in the imaged scene that move during the image data readout are distorted. In some scenarios, a global shutter scheme may be used to expose all pixels 22 in array 20 at the same time in order to mitigate rolling shutter artifacts. However, use of a global shutter scheme can require significant device process complexity, can undesirably reduce sensitivity, reduce pixel charge storage capacity, increase read noise, and increase dark current relative to sensors that perform image capture using a rolling shutter scheme. It would therefore be desirable to provide image sensors that capture images using a rolling shutter scheme with improved systems and methods for capturing and processing image data.

In general, increasing the rate at which image data is read out from image sensor 16 (e.g., sometimes referred to herein as the data rate, scan rate, or frame rate of sensor 16) reduces the magnitude of rolling shutter artifacts in the final image data. However, storage and processing circuitry 18 in imaging system 10 may require image data received from image sensor 16 to have a relatively low data rate. For example, image processing circuitry implemented on storage and processing circuitry 18 may only be able to perform image processing operations on image data received at a system data rate that is less than the scan rate of image sensor 16. In one scenario that is sometimes described herein as an example, storage and processing circuitry 18 may require image data received from image sensor 16 to have a system data rate of 60 frames per second (e.g., circuitry 18 may require that image data be received from sensor 16 at 60 frames per second). This example is merely illustrative and, in general, any desired system data rate may be used.

In order to mitigate rolling shutter artifacts in the captured image data, image sensor 16 may capture and readout image data at a high data rate that is greater than the system data rate at which storage and processing circuitry 18 operates. Imaging system 10 may include image data rate deceleration circuitry 32 (sometimes referred to herein as data rate reduction circuitry or image data frame rate reduction circuitry) that serves as an interface between array 20 that captures and reads out image data at the high data rate and storage and processing circuitry 18 that processes image data at the lower system data rate. Data rate deceleration circuitry 32 may reduce or "decelerate" the data rate of image data captured by pixel array 20 to the lower system data rate so that the image data may be processed by image processing circuitry 20. In this way, imaging system 10 may mitigate rolling shutter artifacts while still being able to process the image data using storage and processing circuitry 18 that operates at a lower system data rate.

In the example of FIG. 2, image sensor 16 captures and outputs image data at a high data rate RH (sometimes referred to herein as higher data rate RH, high speed data rate RH, relatively high data rate RH, high frame rate RH, or high scan rate RH). Column control and readout circuitry 28 may pass the image data to image data rate deceleration circuitry 32 at high data rate RH over path 34. Data rate deceleration circuitry 32 may receive the image data at high data rate RH and may output some or all of the received image data at a low data rate RL to storage and processing circuitry 18 (FIG. 1) via path 38 (e.g., a relatively low data rate RL such as the system data rate used by storage and processing circuitry 18). Data rate deceleration circuitry 32 may include memory circuitry 36, corresponding memory write circuitry such as memory write circuitry 37, corresponding memory read circuitry such as memory read circuitry 39, and any other desired circuitry for interfacing between the relatively high data rate used by image sensor 16 and the relatively low system data rate used by storage and processing circuitry 18 to process image data. In one suitable arrangement that is sometimes described herein as an example, relatively high data rate RH may be 1000 frames per second whereas relatively low data rate RL may be 60 frames per second. This example is merely illustrative and, in general, data rate RH may be any desired data rate that is greater than the system data rate RL (sometimes referred to herein as low data rate RL, low system data rate RL, system frame rate RL, etc.) used by storage and processing circuitry 18 to process image data (e.g., scan rate RH may be 1000 frames per second, greater than 1000 frames per second, between 500 and 1000 frames per second, greater than or equal to 500 frames per second, etc., whereas system data rate RL may be 100 frames per second, 60 frames per second, 24 frames per second, greater than 1 frame per second, less than 100 frames per second, etc.).

Memory write circuitry 37 may include high-speed memory write circuitry that stores (writes) image data as it is received from image sensor 16 (e.g., at high data rate RH) directly onto memory circuitry 36. Memory write circuitry 37 may include associated buffer circuitry, register circuitry, timing circuitry, or any other desired circuitry for writing image data received from readout circuitry 28 directly onto memory 36. Memory 36 may include any desired storage circuitry (e.g., volatile memory circuitry, non-volatile memory circuitry, etc.). Memory read circuitry 39 may include low-speed memory read circuitry that retrieves the stored image data from memory circuitry 36 at a lower data rate than memory write circuitry 37 writes the image data to memory circuitry 36 (e.g., at system data rate RL). Memory read circuitry 39 may include associated buffer circuitry, register circuitry, timing circuitry, or any other desired circuitry for retrieving image data stored on memory 36. Memory read circuitry 39 may output the retrieved image data to path 38 at system data rate RL.

If desired memory circuitry 36 may be formed on a shared integrated circuit chip with deceleration circuitry 32 or may be formed on a corresponding integrated circuit that is separate from deceleration circuitry 32. In one suitable arrangement, memory circuitry 36 is formed on a first integrated circuit chip, image sensor 16 is formed on a second integrated circuit chip that is different from the first integrated circuit chip, and deceleration circuitry 32 (e.g., processing circuitry such as memory read and write circuitry associated with decelerating the data rate of image data received from image sensor 16 to the system data rate) is formed on a third integrated circuit chip that is different from the first and second integrated circuit chips. In another suitable arrangement, memory circuitry 36 and deceleration circuitry 32 are formed on a first integrated circuit chip and image sensor 16 is formed on a second integrated circuit chip that is different from the first integrated circuit chip. In yet another suitable arrangement, image sensor 16, deceleration circuitry 32, and memory circuitry 36 are all formed on a common shared integrated circuit chip.

Image data rate deceleration circuitry 32 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). If desired, image data rate deceleration circuitry 32 may be formed on a common integrated circuit as some or all of storage and processing circuitry 18, on a common integrated circuit as some or all of image sensor 16 and/or camera module 12, or on an integrated circuit that is separate from camera module 12 and storage and processing circuitry 18 (e.g., one or more dedicated integrated circuits).

Figure 3:
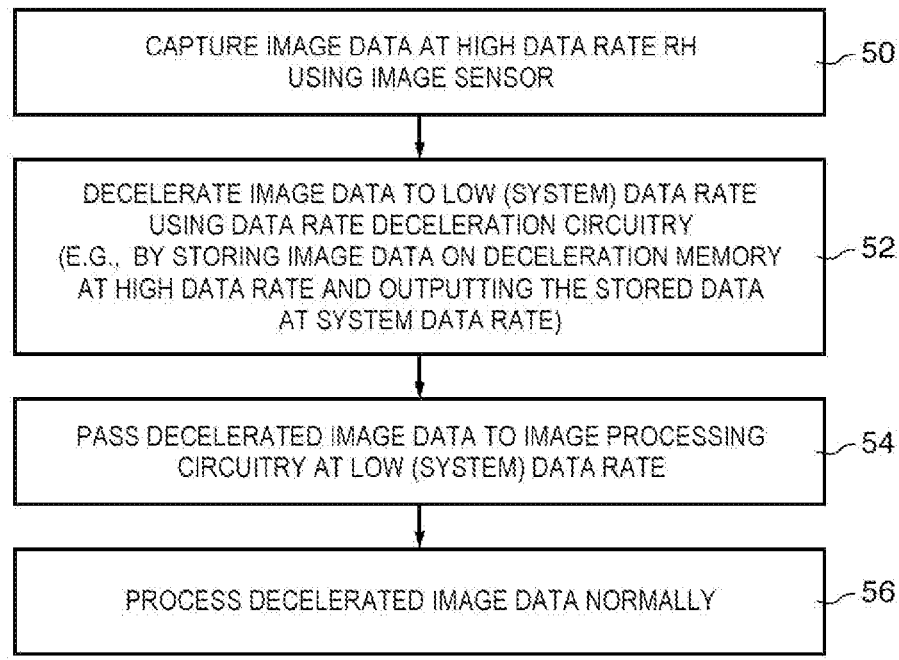
FIG. 3 is a flow chart of illustrative steps that may be performed by an imaging system to capture image data at a high data rate for mitigating rolling shutter artifacts and for reducing the data rate of the captured image data so that the image data may be processed by processing circuitry that operates at a lower system data rate in accordance with an embodiment of the present invention.

FIG. 3 is a flow chart of illustrative steps that may be performed by imaging system 10 to interface between image sensor 16 when image sensor 16 outputs image data at high data rate RH and storage and processing circuitry 18 that operates at system data rate RL (e.g., so that image sensor 16 may mitigate rolling shutter artifacts by increasing the corresponding scan rate while still allowing processing circuitry 18, which operates at system data rate RL, to process the captured image data).

At step 50, image sensor 16 may capture and output image data (e.g., a sequence of image frames) at a high data rate from a scene. Image data captured at the high data rate may sometimes be referred to herein as high data rate image frames, high data rate image data, high rate image frames, high rate image data, high speed image data, or high speed image frames. For example, image sensor 16 may output the image data at high data rate RH (e.g., 1000 frames per second). Image sensor 16 may output the captured image data to data rate deceleration circuitry 32 over path 34 at high data rate RH.

At step 52, data rate deceleration circuitry 32 may perform data rate deceleration (reduction) operations on the received high data rate image data. High-speed memory write circuitry 37 may write the image data at the high data rate directly onto memory circuitry 36 and low-speed memory read circuitry 39 may retrieve the stored image data from memory circuitry 36 at a lower data rate (e.g., system data rate RL). For example, circuitry 32 may receive and store the high data rate image data on memory circuitry 36 and may output the stored high rate image data on path 38 at lower system data rate RL (e.g., 60 frames per second). In this way, circuitry 32 may effectively reduce the data rate of image data captured by sensor 16 from high data rate RH to low data rate RL (e.g., so that storage and processing circuitry 18 may perform processing operations on the image data).

In one example, data rate deceleration circuitry 32 may store a number of frames of image data at the high data rate RH as the frames are received from image sensor 16 (e.g., without overwriting previously stored frames). Deceleration circuitry 32 may output each of the stored frames onto line 38 at low data rate RL after storing the frames on memory 36. For example, deceleration circuitry 32 may receive 16 frames of high speed image data every 1 ms from image sensor 16 and may store each of the frames on memory 36 as they are received. Deceleration circuitry 32 may output a given one of the 16 stored frames every 16 ms so that the output image data is provided to storage and processing circuitry 18 at a lower data rate than the high data rate at which the 16 frames of image data were received by deceleration circuitry 32.

At step 54, deceleration circuitry 32 may pass the output image data (e.g., the decelerated image data) to storage and processing circuitry 18 via path 38 at system data rate RL. At step 56, storage and processing circuitry 18 may perform normal image processing operations on the received decelerated image data (e.g., may perform image processing operations on the received image data at system data rate RL, may provide the received image data to display equipment at system data rate RL, etc.).

When performing imaging operations, image sensor 16 (e.g., processing circuitry 24, readout circuitry 28, and/or row control circuitry 26) may require more power to capture image data at a higher data rate than to capture image data at a lower data rate. For example, image sensor 16 may require more power to capture image data at high data rate RH than at system data rate RL. In order to capture image data at high data rate RH, image sensor 16 may be operated in a high power mode (e.g., in which more power is supplied to sensor 16 by power supply circuitry). Imaging system 10 may include power management circuitry such as power management circuitry 31 that controls the power provided to image sensor 16 for capturing image data. For example, power management circuitry 31 may provide control signals to control and processing circuitry 24, row control circuitry 26, pixel array 20, and/or column circuitry 28 that instruct image sensor 16 to operate in a high power mode or in a low (idle) power mode in which less power is supplied to image sensor 16 than in the high power mode (e.g., based on whether pixel array 20 is to capture image data at high data rate RH). If desired, power management circuitry 31 may control image sensor 16 to operate in the high power mode when capturing image data at high data rate RH and may control image sensor 16 to operate in an idle (e.g., low power) mode when image sensor 16 is not capturing image data. In this way, management circuitry 31 may conserve power when image sensor 16 is not actively capturing and outputting high frame rate images (e.g., thereby improving battery performance in imaging system 10 and/or allowing excess power to be used for other imaging and processing operations in imaging system 10).

Figure 4:
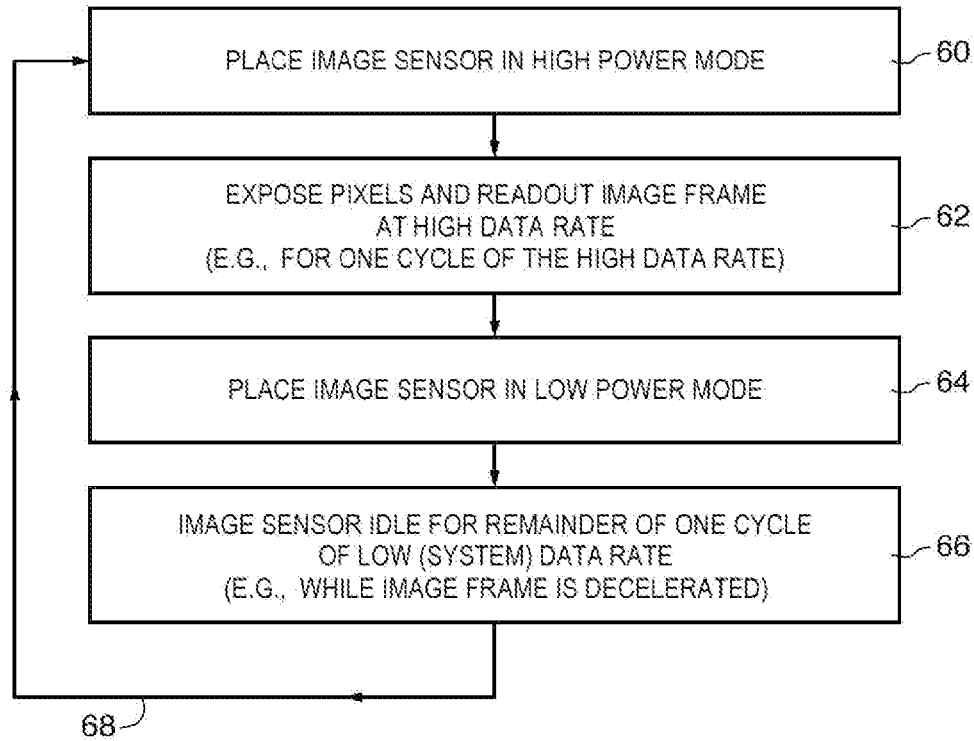
FIG. 4 is a flow chart of illustrative steps that may be performed by an imaging system to selectively operate an image sensor in low and high power modes for capturing high data rate image data while minimizing power consumption in the image sensor in accordance with an embodiment of the present invention.

FIG. 4 is a flow chart of illustrative steps that may be performed by imaging system 10 to capture high data rate image data without consuming excessive power (e.g., by selectively operating image sensor 16 in high and low power modes when capturing frames of image data at high data rate RH). The steps of FIG. 4 may, for example, be performed while processing steps 50 and 52 of FIG. 3.

At step 60, power management circuitry 31 may place image sensor 16 into a high power mode for capturing image data at high data rate RH. In the high power mode, image sensor 16 may receive more power (e.g., from power supply circuitry in system 10) than when in a low or idle power mode.

At step 62, image sensor 16 may expose pixels 22 to image light to generate a high speed frame of image data in response to the image light. Image sensor 16 may generate the frame of image data and may output the frame of image data to data rate deceleration circuitry 32 at high data rate RH. In other words, image sensor 16 may generate a single frame of image data during a single cycle (period) of high data rate RH. In the scenario where high data rate RH is 1000 frames per second, a single frame may be captured and read out in 1/1000 of a second or 1 ms (e.g., a single period of high data rate RH may be 1 ms).

At step 64, power management circuitry 31 may place image sensor 16 into a low (idle) power mode in which image sensor 16 uses less power than when placed in the high power mode. Image sensor 16 may remain idle (e.g., power management circuitry 31 may maintain image sensor 16 in the idle power mode) for the remainder of one period (cycle) of the low (system) data rate relative to the time when image sensor 16 began to capture the high speed image frame (at step 66). After one period of the system data rate has elapsed relative to the time at which image sensor 16 began to capture the image frame, processing may loop back to step 60 as shown by path 68 to capture additional frames of image data at the high data rate.

In the scenario where high data rate RH is 1000 frames per second and system data rate RL is 60 frames per second, the period of high data rate RH is 1 ms whereas the period of system data rate RL is 1/60 of a second or 16.666 . . . ms. Image sensor 16 may capture and read out the image frame at high data rate RH for a time period of 1 ms in the high power mode and may remain idle (e.g., in the low power mode) for a time period of 16.666 . . . −1=15.6666 . . . ms, after which a subsequent high speed image frame is captured and read out for an additional time period of 1 ms (e.g., after looping back to step 60). In this way, deceleration circuitry 32 may output an image frame to storage and processing circuitry 18 every 16.666 . . . ms (i.e., at the system frame rate RL of 60 frames per second) while conserving power when image sensor 16 is not actively capturing image data. When averaged over both the low and high power modes, image sensor 16 may require a similar amount of power as a conventional global shutter image sensor even while capturing image data at a much greater frame rate relative to rolling shutter image sensors that operate at the lower system rate RL. Image sensor 16 may thereby capture image data at a high rate to mitigate rolling shutter artifacts while minimizing power consumption in the image sensor.

If desired, two or more image frames that are captured by image sensor 16 at high data rate RH may be accumulated at deceleration circuitry 32 to generate a single accumulated image frame. Deceleration circuitry 32 may subsequently output the accumulated image frame to storage and processing circuitry 18 at system data rate RL. In this way, the accumulated image frame may include pixel value contributions from multiple high speed image frames while being output to circuitry 18 at system data rate RL.

Figure 5:
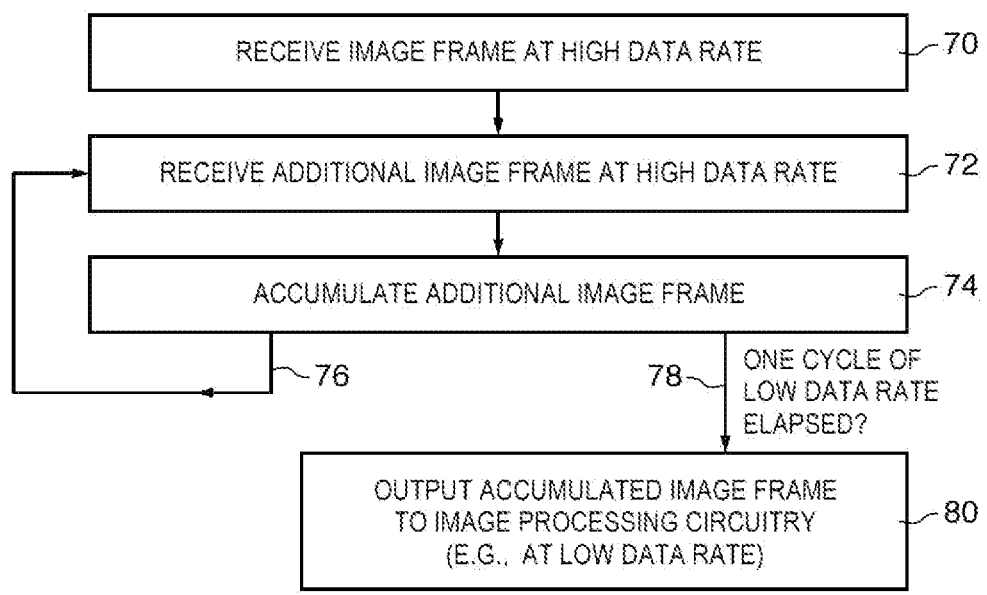
FIG. 5 is a flow chart of illustrative steps that may be performed by image data rate deceleration circuitry for accumulating multiple high data rate image frames into an accumulated image frame that is output to processing circuitry at a lower system data rate in accordance with an embodiment of the present invention.

FIG. 5 is a flow chart of illustrative steps that may be performed by image data rate deceleration circuitry 32 to accumulate image frames received from image sensor 16 at high data rate RH and to output accumulated image frames to storage and processing circuitry 18 at system data rate RL (e.g., thereby effectively reducing the data rate of the image data captured by image sensor 16).

At step 70, deceleration circuitry 32 may receive a first image frame at high data rate RH (e.g., circuitry 32 may receive the first image frame over a period equal to 1/RH from image sensor 16). Deceleration circuitry 32 may store the received first image frame on memory circuitry 36 (e.g., memory write circuitry 39 may write the first image frame to memory 36).

At step 72, deceleration circuitry 32 may receive a second image frame at high data rate RH. At step 74, deceleration circuitry 32 may generate an accumulated image frame by adding the first image frame to the second image frame (e.g., by accumulating the second image frame with the first image frame). For example, memory read circuitry 39 may retrieve the stored first image frame from memory 36, processing circuitry on deceleration circuitry 32 may add (sum) the second image frame to the first image frame to generate the accumulated image frame, and memory write circuitry 37 may write the accumulated image frame back to memory 36 (e.g., deceleration circuitry 32 may store the accumulated image frame on memory circuitry 36). Processing may subsequently loop back to step 72 as shown by path 76 to receive additional frames of image data from image sensor 16 at high data rate RH and to add the additional frames to the accumulated image frame (e.g., each subsequent frame may be accumulated with the previous accumulated frame). In this way, the accumulated frame may exhibit an increased effective capacity for each of pixels 22 and an improved maximum signal-to-noise ratio and dynamic range relative to a single captured high speed image frame (e.g., the maximum signal-to-noise ratio and dynamic range may be improved relative to a single frame by the square root of the number of frames accumulated in the accumulated frame).

Deceleration circuitry 32 may continue to accumulate image frames captured at high data rate RH until one cycle of the low data rate (e.g., after a period equal to 1/RL) has elapsed. In the example where high data rate RH is 1000 frames per second and system data rate RL is 60 frames per second, a new frame may be added to the accumulated frame every 1 ms for 16 ms (when one period of system data rate RL has elapsed). In this scenario, the accumulated frame may include pixel value contributions from 16 different high speed image frames captured by image sensor 16. After one cycle (period) of the low data rate has elapsed, processing may proceed to step 80 as shown by path 78.

At step 80, deceleration circuitry 32 may output the accumulated frame to storage and processing circuitry 18. As circuitry 32 only outputs the accumulated frame once per cycle of system frame rate RL, accumulated frames are output at system frame rate RL and storage and processing circuitry is thereby able to properly perform image processing operations on the received accumulated frames. In this way, deceleration circuitry 32 may receive high data rate image frames from image sensor 16 (e.g., to mitigate rolling shutter artifacts) and may output the image data to storage and processing circuitry operating at a lower system frame rate while improving the maximum signal-to-noise ratio and dynamic range of the image data relative to a single high speed image frame (e.g., a single image frame captured at rate RH).

In the example of FIG. 5, each additional image frame is added to an accumulated image frame that is stored on memory 36. This example is merely illustrative. If desired, memory circuitry 36 may separately store each image frame received from image sensor 16 and deceleration circuitry 36 may accumulate each of the image frames (e.g., by adding each of the image frames) into a single accumulated image frame after each of the image frames have been separately stored on memory circuitry 36.

If desired, each high speed image frame received by deceleration circuitry 32 at data rate RH from image sensor 16 may have the same exposure time (e.g., 1 ms). For example, in the scenario where high rate RH is 1000 frames per second and system rate RL is 60 frames per second, 16 image frames each having a 1 ms exposure time may be accumulated into an accumulated image frame that is output to storage and processing circuitry 18 every 16 ms (e.g., at a system frame rate RL of 60 frames per second). If desired, two or more high speed image frames received by deceleration circuitry 32 at rate RH from image sensor 16 may have the different exposure times (e.g., image sensor 16 may capture high speed image frames using different exposure times). For example, the accumulated frame generated by deceleration circuitry 32 may be generated using a first frame captured by image sensor 16 using an exposure time of 1 ms, a second frame captured by image sensor 16 using an exposure time of 11 ms, and a third frame captured by image sensor 16 using an exposure time of 1 ms. In this scenario, different high speed data rates that are each greater than the system data rate are used to capture and read out image frames using image sensor 16. In general, any desired number of different high speed data rates greater than the system data rate may be used to generate the image frames. Deceleration circuitry 32 may accumulate the first, second, and third image frames into an accumulated image frame using a high-dynamic-range (HDR) image combination process and may output the accumulated frame at the system data rate RL (e.g., 60 frames per second).

The dynamic range of an image may be defined as the luminance ratio of the brightest element in a given scene to the darkest element the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows.

An image may be considered an HDR image if it has been generated using imaging processes or software processing designed to increase dynamic range. As an example, HDR images may be captured by a digital camera using a multiple integration (or multiple exposure) process. In a multiple exposure process, multiple images (sometimes referred to as image frames) of the same scene may be captured using different exposure (or integration) times. A short-exposure image captured during a short integration time may better capture details of brightly lit portions of the scene, whereas a long-exposure image captured during a relatively longer integration time may better capture details of dark portions of the scene. The short-exposure and long-exposure images may be combined into a composite HDR image that accurately represents the brightly lit as well as the dark portions of the image.

In the example of FIG. 5 in which different exposure times are used for each of the high speed image frames that are accumulated into the accumulated image frame, portions of the longer exposure image frames (e.g., portions of the 11 ms exposure image frame of darker portions of the scene) may be combined with portions of the shorter exposure frames (e.g., portions of the 1 ms exposure image frames of lighter portions of the scene) to generate an accumulated HDR image frame.

Figure 6:
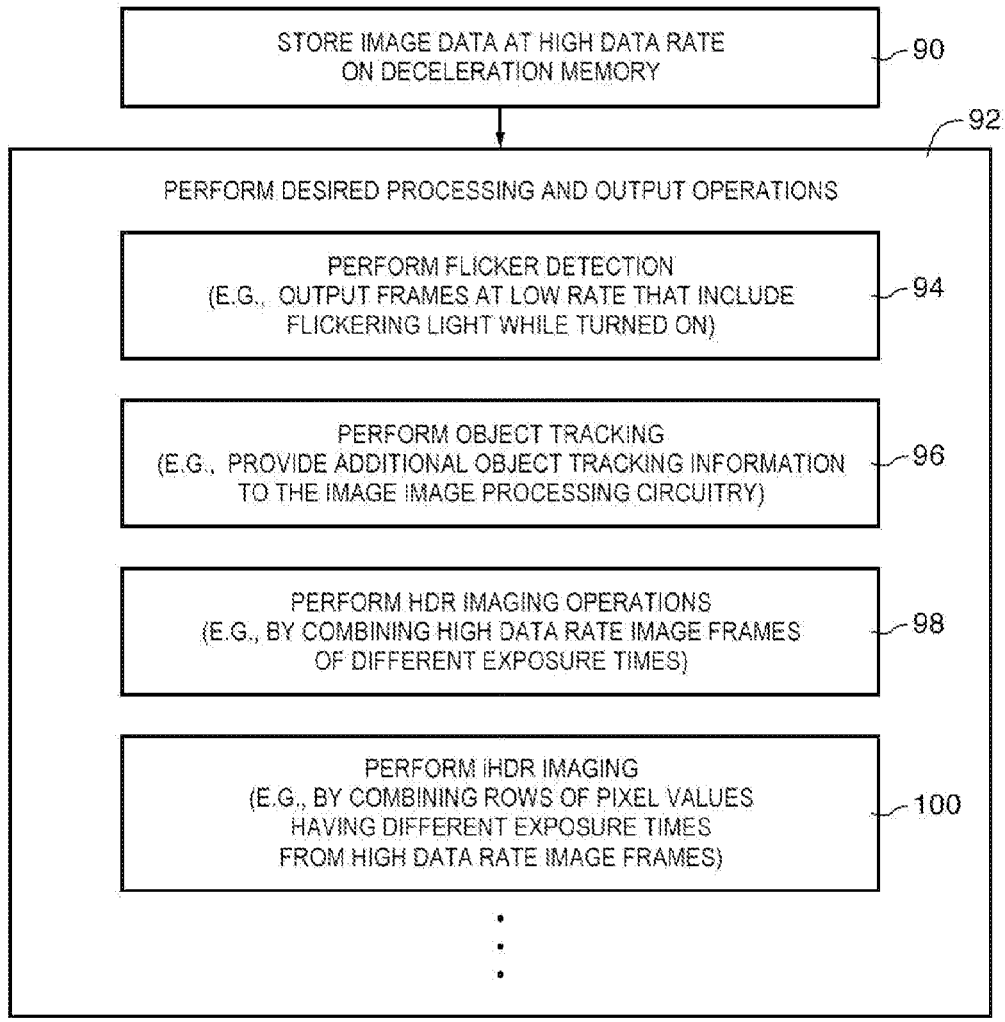
FIG. 6 is a flow chart of illustrative steps that may be performed by image data rate deceleration circuitry for processing high data rate image frames received from an image sensor prior to outputting the image data to processing circuitry at a lower system data rate in accordance with an embodiment of the present invention.

If desired, image data rate deceleration circuitry 32 may perform image processing operations on the received and stored high data rate image data prior to outputting the image data at the system data rate RL. FIG. 6 is a flow chart of illustrative steps that may be performed by deceleration circuitry 32 to perform processing operations on the image data received from image sensor 16 at high data rate RH. The steps of FIG. 6 may, for example, be performed while processing steps 52 and 54 of FIG. 3.

At step 90, deceleration circuitry 32 may store image data (e.g., one or more high speed image frames output by image sensor 16 at high rate RH) on memory circuitry 36. At step 92, circuitry 32 may perform desired processing and output operations on the stored high speed image data. For example, at step 94, circuitry 32 may perform flicker detection operations on the stored image data.

Some light sources in a given scene captured by imaging system 10 may exhibit a variable intensity or flicker. For example, light sources such as LEDs may vary in intensity (flicker) over time at a high frequency. If care is not taken, when the capture (exposure) time used by image sensor 16 is reduced to reduce sensitivity of the image sensor (e.g., for a bright scene), the scan rate of sensor 16 and the frequency of the flickering light source may be comparable such that rows of array 20 that would capture the light source may be in their insensitive mode when the light is turned on (e.g., the light source may be off when pixels 22 are capturing image signals). In this scenario, the image sensor may not capture light from the light source the final image data will erroneously appear as if the light source is not present in the scene. By capturing images at a high data rate RH, image sensor 16 may have a great enough frequency that flickering light sources may be captured in at least one of the image frames captured by image sensor 16 prior to passing image data to processor 18 at system data rate RL.

By generating an accumulated image frame from the high speed image frames, deceleration circuitry 32 may include the high speed image frames in which the flickering light source was turned on, thereby including the flickering light source in the accumulated image. For example, if each accumulated image frame includes contributions from 16 high speed image frames captured by image sensor 16, at least one of the 16 high speed image frames will include image data of the flickering light source while the light source is turned on, which will be reflected in the accumulated image frame. In this way, deceleration circuitry 32 may output images (e.g., accumulated images) to storage and processing circuitry 18 in which the flickering light source has been captured. In another suitable arrangement, deceleration circuitry 32 may output only those high speed frames in which the flickering light source is turned on.

At step 96, deceleration circuitry 32 may perform object tracking operation on the stored image frames. For example, deceleration circuitry 32 may identify one or more objects in the scene from the stored image frames and may generate tracking information (e.g., image metadata about the tracked objects) that identifies the tracked object in the image data. Deceleration circuitry 32 may identify and track the motion of objects in the image data and may provide information about the tracked objects to storage and processing circuitry 18 along with the output image frames.

At step 98, deceleration circuitry 32 may perform HDR imaging operations using the stored image frames. For example, deceleration circuitry 32 may combine high speed image frames received from image sensor 16 that were captured using relatively long exposure times with high speed image frames received from image sensor 16 that were captured using relatively short exposure times into a single high-dynamic-range accumulated image frame. Deceleration circuitry 32 may combine the image frames using any desired high-dynamic-range processing technique (e.g., using a tone mapping algorithm, etc.). Deceleration circuitry 32 may output the HDR accumulated image frame to storage and processing circuitry 18 at system data rate RL.

When capturing HDR images using multiple exposure imaging methods, or any HDR imaging system using sequentially captured images, a moving object or stationary objects in a scene captured by a moving (e.g., shaking) camera will often be registered at different pixel positions in each image. When the images are combined, the discrepancy in position and/or shape of a moving object in the multiple exposures can result in motion artifacts in the final HDR image. In order to mitigate motion artifacts associated with an multiple exposure imaging process, HDR images may be captured by a digital camera using an interleaved integration (or interleaved exposure) process. In an interleaved exposure process, interleaved images may be captured by an image sensor. The interleaved images may have rows of long-exposure image pixel values that are interleaved (or interspersed) with rows of short-exposure image pixel values.

At step 100, deceleration circuitry 32 may perform interleaved HDR (iHDR) imaging operations by combining selected rows of pixel values from high speed short exposure image frames and high speed long exposure image frames stored on memory circuitry 36. If desired, some rows of the image can be captured multiple times during a desired readout period while other rows are captured only once, to generate an interleaved high-dynamic-range accumulated image that is output to storage and processing circuitry 18. For example, if every other row of pixels 22 integrates for an entire readout period (e.g., one cycle of system data rate RL) the other rows of pixels may be integrated for multiple short exposure periods (e.g., a first image frame may be stored on memory circuitry 36 having pixel values for every other row of array 20 that were accumulated during one cycle of system data rate RL whereas additional image frames may be stored on circuitry 36 having pixel values for the remaining rows of array 20 that were accumulated during a fraction of one cycle of system data rate RL). The long and short exposure images may be combined using any desired HDR image processing algorithm into an accumulated iHDR image that is provided to processing circuitry 18 at system data rate RL.

The example of FIG. 6 is merely illustrative. Deceleration circuitry 32 may perform any desired number of steps 94, 96, 98, and 100 on the captured high speed image frames (e.g., circuitry 32 may perform zero or more of steps 94, 96, 98, and 100). Deceleration circuitry 32 may perform any other desired image processing operations on the high speed image frames stored on memory circuitry.

Imaging system 10 may thereby capture image frames at a high scan rate to mitigate rolling shutter artifacts in the final image while still allowing processing circuitry such as processing circuitry 18 that operates at a lower system data rate to operate on the image data. Imaging system 10 may generate image data with reduced dark current and read noise and increased sensitivity and effective pixel charge capacity relative to global shutter imaging systems.

Figure 7:
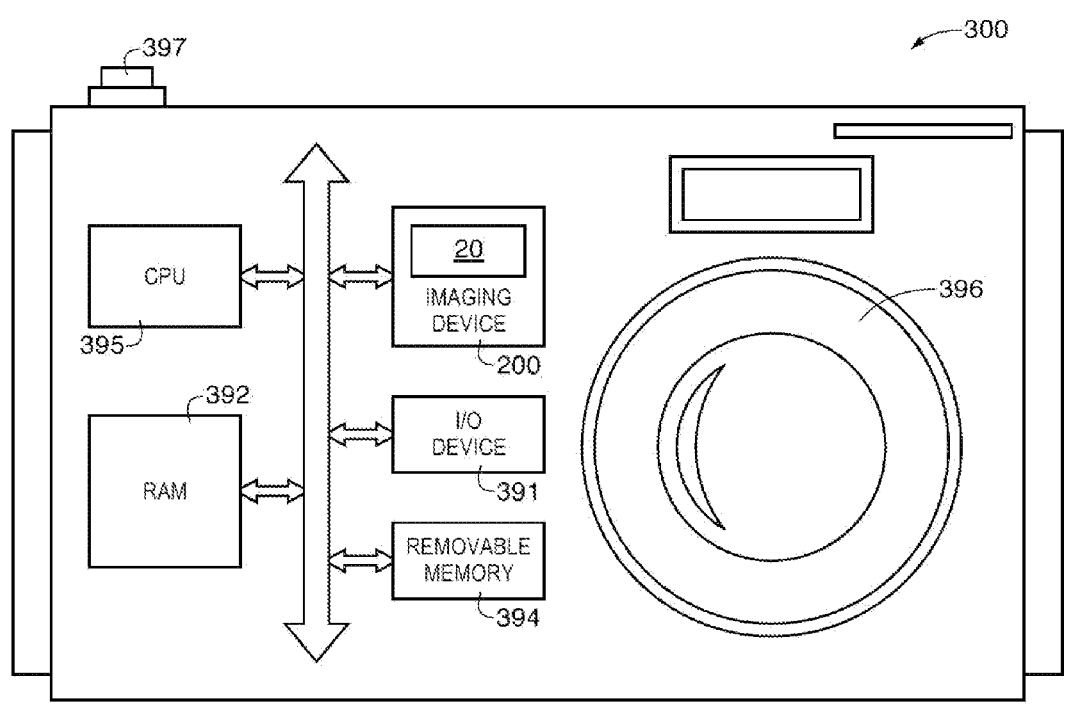
FIG. 7 is a block diagram of a processor system employing the embodiments of FIGS. 1-6 in accordance with an embodiment of the present invention.

FIG. 7 shows in simplified form a typical processor system 300, such as a digital camera, which includes an imaging device 200 (e.g., an imaging device 200 such as device 10 of FIGS. 1-6). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating systems and methods for generating images using a rolling shutter image sensor pixel array to capture and output image data at a high frame rate for mitigating rolling shutter artifacts in the image data.

An imaging system may include a rolling shutter image sensor that generates image data using a rolling shutter process and that outputs the image data to processing circuitry (e.g., image data frame rate deceleration circuitry) at a first high speed data (frame) rate (e.g., a data rate greater than or equal to 1000 frames per second, greater than or equal to 500 frames per second, etc.). The rolling shutter image sensor may output frames of image data at the first data rate and memory circuitry on the processing circuitry may store the frames of image data at the first data rate. The processing circuitry may output the stored image data at a second low speed data (frame) rate (e.g., a data rate less than or equal to 120 frames per second, less than or equal to 60 frames per second, less than or equal to 24 frames per second, etc.). Additional processing circuitry (e.g., image processing circuitry) may receive the image data at the second data rate and may perform image processing operations on the image data at the second data rate.

If desired, the imaging system may include power management circuitry that operates the rolling shutter image sensor in a high power mode while the rolling shutter image sensor is outputting the image data at the first data rate and that operates the rolling shutter image sensor in an idle power mode while the rolling shutter image sensor is not outputting the image data at the first data rate. For example, the power management circuitry may operate the rolling shutter image sensor in the high power mode for one period of the first data rate when the rolling shutter image sensor is outputting the image data at the first data rate and may operate the rolling shutter image sensor in the idle power mode for a time period equal to a difference between the one period of the first data rate and one period of the second data rate while the rolling shutter image sensor is not outputting the image data at the first rate. In this way, the imaging system may minimize average power consumption in the image sensor even though the image sensor outputs image data at a high frame rate.

If desired, the processing circuitry may generate accumulated image frames by accumulating (e.g., adding) the image frames received from the rolling shutter image sensor at the first data rate and may provide the accumulated image frame to the image processing circuitry at the second data rate. The image frames received from the image sensor may include short exposure image frames and long exposure image frames each captured using respective integration times using the image sensor. The processing circuitry may generate a high-dynamic-range accumulated image by combining the short exposure image frame and the long exposure image frame of the set of image frames and may output the high-dynamic-range accumulated image to the image processing circuitry at the second data rate. If desired, the processing circuitry may generate an interleaved high-dynamic-range accumulated image by combining a set of rows from the short exposure image with a set of rows from the long exposure image and may output the interleaved high-dynamic-range accumulated image to the image processing circuitry at the second data rate. The image processing circuitry may perform image processing operations on the accumulated images.

If desired, the processing circuitry may perform flicker detection operations on the image data based on the set of image frames stored on the memory circuitry. The processing circuitry may perform object tracking operations on the image data to track an object in the image data based on the set of image frames stored on the memory circuitry at the first data rate. The processing circuitry may provide object tracking information associated with the tracked object to the image processing circuitry.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
   a rolling shutter image sensor having first memory circuitry, wherein the first memory circuitry of the rolling shutter image sensor is configured to output a plurality of entire image frames at a first image frame rate; and
   processing circuitry, wherein the processing circuitry is configured to receive the plurality of entire image frames from the rolling shutter image sensor at the first image frame rate and store the plurality of entire image frames in second memory circuitry that is different from the first memory circuitry, and wherein the processing circuitry is configured to output image frames in the plurality of entire image frames from the second memory circuitry at a second image frame rate that is less than the first image frame rate.

2. The imaging system defined in claim 1, further comprising:
   additional processing circuitry, wherein the additional processing circuitry is configured to receive the image frames in the plurality of entire image frames from the second memory circuitry at the second image frame rate, and wherein the additional image processing circuitry is configured to perform image processing operations on the image frames in the plurality of entire image frames at the second image frame rate.

3. The imaging system defined in claim 2, wherein the second image frame rate comprises a system data rate of the additional processing circuitry.

4. The imaging system defined in claim 2, wherein the rolling shutter image sensor is formed on an integrated circuit and wherein the processing circuitry is formed on the integrated circuit.

5. The imaging system defined in claim 2, wherein the rolling shutter image sensor is formed on a first integrated circuit, the processing circuitry is formed on a second integrated circuit that is different from the first integrated circuit, and the additional processing circuitry is formed on a third integrated circuit that is different from the first and second integrated circuits.

6. The imaging system defined in claim 1, wherein the second memory circuitry is formed on a first integrated circuit, the processing circuitry is formed on a second integrated circuit that is different from the first integrated circuit, and the rolling shutter image sensor is formed on a third integrated circuit that is different from the first and second integrated circuits.

7. The imaging system defined in claim 1, wherein the second memory circuitry is formed on a first integrated circuit, the processing circuitry is formed on the first integrated circuit, and the rolling shutter image sensor is formed on a second integrated circuit that is different from the first integrated circuit.

8. The imaging system defined in claim 1, wherein the second memory circuitry, the rolling shutter image sensor, and the processing circuitry are all formed on a shared integrated circuit chip.

9. The imaging system defined in claim 1, wherein the first image frame rate is greater than or equal to 500 frames per second and wherein the second image frame rate is less than or equal to 120 frames per second.

10. The imaging system defined in claim 1, further comprising:
    power management circuitry, wherein the power management circuitry is configured to operate the rolling shutter image sensor in a high power mode while the first memory circuitry outputs the plurality of entire image frames at the first image frame rate and wherein the power management circuitry is configured to operate the rolling shutter image sensor in an idle power mode while the first memory circuitry is not outputting the plurality of entire image frames at the first image frame rate.

11. The imaging system defined in claim 10, wherein the power management circuitry is configured to operate the rolling shutter image sensor in the high power mode for one period of the first image frame rate while the first memory circuitry outputs the plurality of entire image frames at the first image frame rate, and wherein the power management circuitry is configured to operate the rolling shutter image sensor in the idle power mode for a time period equal to a difference between the one period of the first image frame rate and one period of the second image frame rate while the first memory circuitry is not outputting the plurality of entire image frames at the first image frame rate.

12. The system defined in claim 1, wherein the second memory circuitry is configured to store a set of entire image frames outputted by the processing circuitry.

13. The system defined in claim 12, wherein the processing circuitry is configured to perform flicker detection operations on a plurality of image frames based on the set of image frames stored on the memory circuit.

14. The system defined in claim 12, wherein the processing circuitry is configured to perform object tracking operations on the plurality of image frames based on the set of image frames stored on the second memory circuitry, and wherein the processing circuitry is configured to provide object tracking information associated with the tracked object to the additional processing circuitry.

15. The imaging system defined in claim 1, wherein the rolling shutter image sensor comprises an array of image sensor pixels arranged in rows and columns and wherein the first memory circuitry is coupled to each column of image sensor pixels in the array over corresponding conductive column lines.

16. A system, comprising:
a central processing unit;
memory;
input-output circuitry; and
an imaging device, wherein the imaging device comprises:
an array of image sensor pixels arranged in rows and columns, wherein the array of image sensor pixels is configured to generate first and second of entire image frames using a rolling shutter process and wherein first memory circuitry coupled to the array of image sensor pixels is configured to output the first and second entire image frames at a first frame rate;
a lens configured to focus light onto the array;
image data frame rate reduction circuitry, wherein the image data frame rate reduction circuitry is configured to store the first and second entire image frames in second memory circuitry that is different from the first memory circuitry at the first frame rate, and wherein the image data frame rate reduction circuitry is configured to output image data from the first and second entire image frames stored in the second memory circuitry at a second frame rate that is less than the first frame rate; and
image processing circuitry, wherein the image processing circuitry is configured to perform image processing operations on the image data at the second frame rate.

17. The system defined in claim 16, wherein the image data frame rate deceleration circuitry is configured to generate an accumulated image frame by accumulating a third entire image frame with a fourth entire image frame, wherein the third and fourth entire image frames are received by the image data frame rate deceleration circuitry at the first frame rate.

18. The system defined in claim 17, wherein the image data frame rate deceleration circuitry is configured to output the accumulated image frame to the image processing circuitry at the second frame rate, and wherein the image processing circuitry is configured to perform image processing operations on the accumulated image frame at the second frame rate.

19. The system defined in claim 17, wherein the third and fourth entire image frames comprise:
short exposure image data; and
long exposure image data.

20. The system defined in claim 19, wherein the accumulated image frame generated by the image data frame rate deceleration circuitry comprises:
high-dynamic-range accumulated images, wherein the high-dynamic-range accumulated images comprise the short exposure image data and the long exposure image data.

* * * * *